United States Patent [19]

Plummer

[11] 3,716,433
[45] Feb. 13, 1973

[54] METHOD OF EQUIPPING A TOOL HANDLE OR HAND GRIP WITH A TOUGH ADHERENT PROTECTIVE LAYER WITH ENHANCED GRIPPING PROPERTIES

[76] Inventor: Walter A. Plummer, 3546 Crownridge Drive, Sherman Oaks, Calif.

[22] Filed: Sept. 18, 1970

[21] Appl. No.: 73,492

[52] U.S. Cl. ............... 156/85, 16/110 R, 145/61 R, 156/213, 156/295
[51] Int. Cl. .................................................. B29c 27/10
[58] Field of Search....156/84, 85, 86, 294, 213, 295; 16/110, 116 R; 306/32; 145/61 R, 61 C

[56] References Cited

UNITED STATES PATENTS

| | | | |
|---|---|---|---|
| 2,916,774 | 12/1959 | Wetty et al. | 145/61 R |
| 2,985,209 | 5/1961 | Novelo | 145/61 R |
| 3,072,517 | 1/1963 | Gaylord | 156/84 X |
| 3,359,943 | 12/1967 | Briggs et al. | 117/96 X |
| 3,470,046 | 9/1969 | Verdin | 156/86 |
| 3,578,825 | 5/1971 | Merrow | 306/32 |

*Primary Examiner*—Edward G. Whitby
*Attorney*—Sellers and Brace

[57] ABSTRACT

A method of providing a tool handle or the like hand grip with a tough protective strong-gripping layer by shrinking and bonding a sleeve of heat-reactive thermoplastic material thereto.

6 Claims, 5 Drawing Figures

PATENTED FEB 13 1973

3,716,433

INVENTOR
WALTER A. PLUMMER
BY
ATTORNEYS

METHOD OF EQUIPPING A TOOL HANDLE OR HAND GRIP WITH A TOUGH ADHERENT PROTECTIVE LAYER WITH ENHANCED GRIPPING PROPERTIES

This invention relates to tool handles and the like hand grips and more particularly to an improved method of permanently assembling thereto a protective layer of thermoplastic material providing greatly enhanced gripping and safety properties.

Tool handles and hand grips for a wide variety of appliances, sporting goods, tools and other devices have need for a protective finish having numerous characteristics not satisfactorily satisfied by the techniques and proposals heretofore made. Not only is it highly important that of innumerable implements, such as axes, hammers, golf clubs, bats, etc., to name but a few, the gripping surface be highly resistant to slippage when gripped but it must be resistant to abrasion, corrosion, attack by the elements, withstand a wide variety of abuses and provide reliable protection against slippage, loss of control, malfunctioning, electrical shocks and meet other well known requirements.

The simple, quickly performed method and technique characterizing this invention meets the foregoing and other exacting and widely variant needs to a highly satisfactory degree by utilizing the highly advantageous properties of heat reactive thermoplastic tubing. This material is readily available on the market in any desired diameter and wall thickness, and possesses a shrinkage coefficient of at least 20 percent in most embodiments thereof. This material quickly shrinks upon the application of heat into snug fitting conformity with any underlying surface falling within the latitude of its shrinkage capabilities. Sleeving of appropriate size is selected for loose fitting assembly over the tool handle to be encapsulated following completion of which heat is applied to its exterior adequate to soften the material thereby automatically releasing internal stresses and allowing the material to shrink until snugly bearing against the juxtaposed underlying surface. Desirably, the ends of the sleeve project beyond the adjacent ends of the handle with the result that the application of heat causes the ends to curl inwardly into snug conformity with the handle ends. Desirably, a layer of adhesive is applied between the handle surface and the interior of the sleeve thereby further strengthening and reinforcing the final assembly.

It is therefore an important object of the invention to provide an improved method of providing tool handles and other hand grips with an improved strong-adherent protective covering with pronounced anti-slipping characteristics.

Another object of the invention is the provision of an improved technique for finishing tool handles and hand grips with a non-slip, non-conductive, permanent protective cover.

These and other more specific objects will appear upon reading the following specification and claims and upon considering in connection therewith the attached drawing to which they relate.

Referring now to the drawing in which a preferred embodiment of the invention is illustrated:

Figure 1:
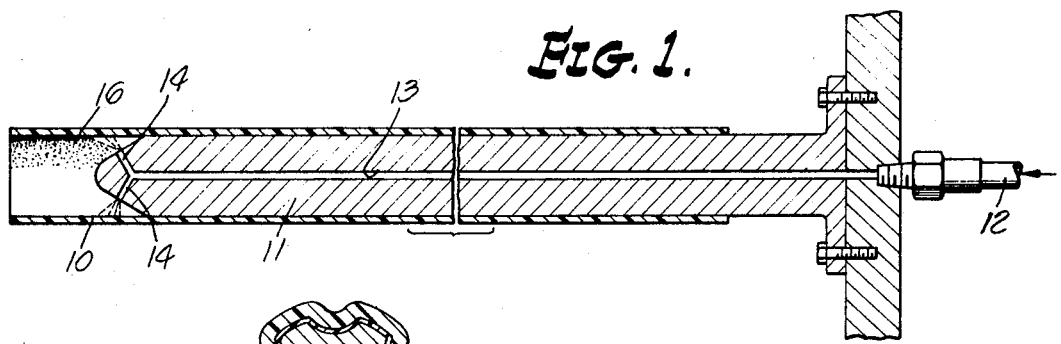
FIG. 1 is a cross sectional view showing one suitable means for applying adhesive to the interior of the invention hand grip sleeve.

Referring initially more particularly to FIG. 1, there is shown a length of the invention heat reactive thermoplastic sleeving 10 telescoped over a spray nozzle 11 which is supplied through hose 12 with any suitable adhesive material. This adhesive flows through passage 13 of the nozzle and through its discharge ports 14 onto the interior surface of sleeving 10. Typically, the tubing is inserted over nozzle 11 until properly positioned for the deposit of the adhesive layer 16 onto the innermost end of the sleeve. The sleeve is then gradually withdrawn from the nozzle so as to deposit a layer 16 of adhesive of uniform thickness.

Figure 4:
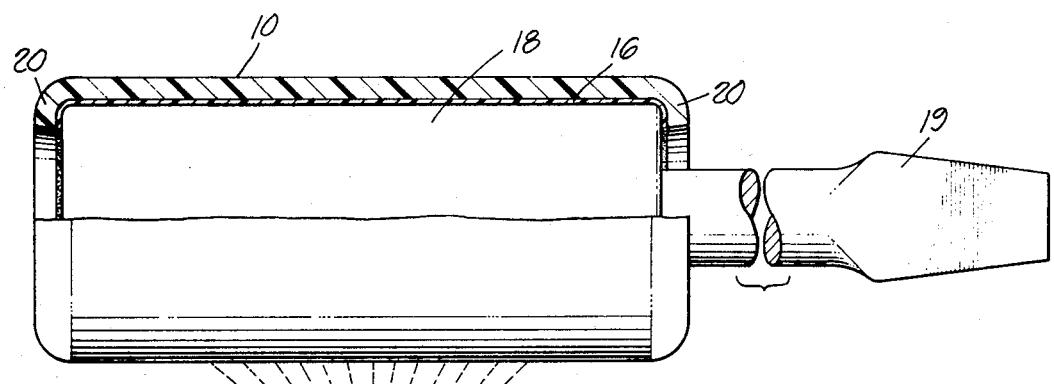
FIG. 4 is a side view, partly in section, of a typical tool handle in the process of having the protective sleeve shrunk thereagainst.

After the sleeve has been coated with adhesive it is assembled to a hand grip by telescoping it over one end of the tool handle, such as the handle 18 of a screw driver bit 19. In the usual case, sleeve 10 has a length slightly in excess of the handle being encapsulated so that its ends 20,20 project slightly beyond the handle ends. The assembly operation is accomplished quickly and easily and without displacing the adhesive owing to the slightly larger diameter of the sleeve. The parts are then bonded together by the simple expedient of applying moderate heat, such as from the hot air nozzle 22 to all parts of sleeve 10. It is desirable that the hot air nozzle be moved so as to direct hot air against and soften all parts of the sleeve. An air temperature of 150°–200° is quite satisfactory although the operating temperature depends upon how close the air nozzle is held and how quickly it is moved from place to place over the sleeve. All that is required is sufficient heat to soften the sleeve material whereupon it quickly shrinks and draws very snugly against the underlying surface. Likewise, the opposite ends of the sleeve collapse and curl about the adjacent ends of the handle, as is clearly indicated in FIG. 4.

Figure 5:
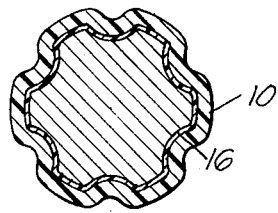
FIG. 5 is a cross sectional view through a typical tool handle of non-cylindrical cross-section in its final assembled condition.
Figure 2:
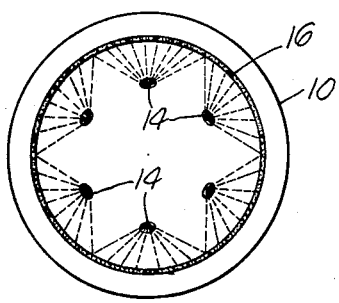
FIG. 2 is an end view on an enlarged scale taken from the left hand end of FIG. 1.
Figure 3:
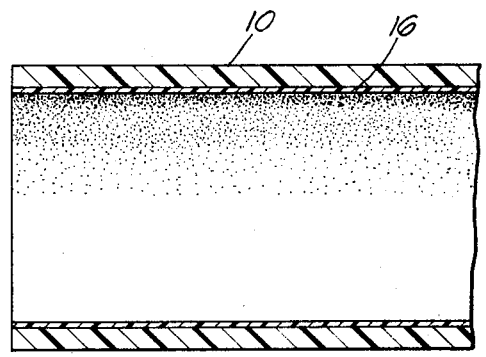
FIG. 3 is an enlarged cross sectional view of the sleeve with the applied adhesive.

In many instances the tool handle is provided with a non-cylindrical exterior surface to enhance its gripping characteristics. One of the many typical non-cylindrical configurations is shown in FIG. 5 wherein it will be noted that the protective thermoplastic layer has shrunk into high fidelity configuration with the underlying surface of the handle to which it is strongly bonded by the adhesive layer 16.

While the particular method of equipping a tool handle or hand grip with a tough adherent protective layer herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. That method of providing a tool handle, hand grip or the like with a non-conductive high-grip protective layer which comprises: telescoping a sleeve of heat reactive thermoplastic material having a length greater than the length of the hand grip and a high shrinkage coefficient over the hand grip of the handle to be protected with at least one end thereof projecting slightly beyond the end of said hand grip, and subjecting the assembly to heat adequate to shrink said sleeve into a snug fit with the juxtaposed surface of the handle with said projecting end of said sleeve curled snugly against the juxtaposed end of said hand grip.

2. That method defined in claim 1 characterized in applying a layer of adhesive between the surface of the handle and the inner surface of said sleeve of heat reactive material.

3. That method defined in claim 1 characterized in the step of applying a layer of adhesive to the surface of one of the aforesaid two components before heating said heat reactive material to shrink it against the surface of said handle.

4. That method defined in claim 1 characterized in the step of applying a layer of adhesive to the interior surface of said sleeve prior to telescoping the same over the handle.

5. That method defined in claim 4 characterized in the step of applying said layer of adhesive to said sleeve by jetting adhesive onto the inner surface of the sleeve progressively from one end thereof toward the other end of the sleeve.

6. That method defined in claim 1 characterized in telescoping said sleeve of heat reactive material over a handle having a non-cylindrical outer surface, and applying heat to heat shrink said sleeve into snug conformity with said non-cylindrical surface.

* * * * *